US006213286B1

(12) United States Patent
Hunter et al.

(10) Patent No.: US 6,213,286 B1
(45) Date of Patent: Apr. 10, 2001

(54) ADJUSTABLE CARTON FEEDER

(75) Inventors: Johnny J. Hunter, Woodstock; Will L. Culpepper, Covington, both of GA (US)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 09/175,675

(22) Filed: Oct. 20, 1998

(51) Int. Cl.[7] .............................. B65G 17/46; B65H 5/08

(52) U.S. Cl. ........................................... 198/471.1; 271/11

(58) Field of Search ............................ 198/471.1; 271/11, 271/94, 96

(56) References Cited

U.S. PATENT DOCUMENTS 4,121,819 * 10/1978 DiFrancesco et al. ................. 271/96
4,582,201 * 4/1986 Taniguchi et al. ................ 198/471.1
4,840,266 * 6/1989 Gherardi ........................... 198/471.1
5,102,385 4/1992 Calvert ................................. 493/315
5,241,816 9/1993 Ziegler et al. ......................... 53/566

* cited by examiner

*Primary Examiner*—Robert P. Olszewski
*Assistant Examiner*—Bryan Jaketic
(74) *Attorney, Agent, or Firm*—Michael V. Drew

(57) ABSTRACT

A carton feeder has a plurality of suction-cup stations for engaging cartons. A valve mechanism which includes a rotating valve, a stationary valve and a change-over valve selectively applies vacuums to different ones of the plurality of suction-cup stations such that particular combinations of suction-cup stations can be activated or deactivated to engage particular sizes and styles of cartons. Changeover of the application of vacuum is accomplished by changing the alignment of vacuum apertures in the changeover valve and vacuum apertures in the stationary valve with respect to another whereby a first alignment provides vacuum to a first combination of suction-cup stations and a second alignment provides vacuum to a second combination of suction-cup stations.

2 Claims, 6 Drawing Sheets

ADJUSTABLE CARTON FEEDER

The invention relates to continuous-motion cartoning machines and, more particularly, relates to a carton feeder for such a machine wherein the feeder can be adjusted to accommodate different sizes of cartons.

Continuous-motion cartoning machines are useful for packaging multiple articles such as beverage cans in cartons or other packaging components. An example of a continuous-motion cartoning machine is shown in U.S. Pat. No. 5,241,806 to Ziegler et al.

Carton feeders are generally mechanisms in cartoning machines which engage a carton at a first location of the machine and place the carton at a second location of the machine. Usually the first location is a carton hopper from which the feeder removes the carton. The second location is usually downstream of the first location. An example of a feeder mechanism is found in U.S. Pat. No. 5,102,385 to Calvert, which is owned by the same owner of the present invention, namely, The Mead Corporation.

A cartoning machine is more useful if it is able to package more than one size and style of carton. Thus, it can be appreciated that it would be useful to have a carton feeder that can be adjusted to accommodate more than one size and style of carton.

SUMMARY OF THE INVENTION

In accordance with a preferred embodiment of the present invention, a carton feeder has a plurality of suction-cup stations for engaging cartons. A valve mechanism which includes a rotating valve, a stationary valve and a changeover valve selectively applies vacuums to different ones of the plurality of suction-cup stations such that particular combinations of suction-cup stations can be activated or deactivated to engage particular sizes and styles of cartons. Changeover of the application of vacuum is accomplished by changing the alignment of vacuum apertures in the changeover valve and vacuum apertures in the stationary valve with respect to another whereby a first alignment provides vacuum to a first combination of suction-cup stations and a second alignment provides vacuum to a second combination of suction-cup stations.

Other advantages and objects of the present invention will be apparent from the following description, the accompanying drawings, and the appended claims.

DETAILED DESCRIPTION OF A PREFERRED EMBODIMENT

Figure 1:
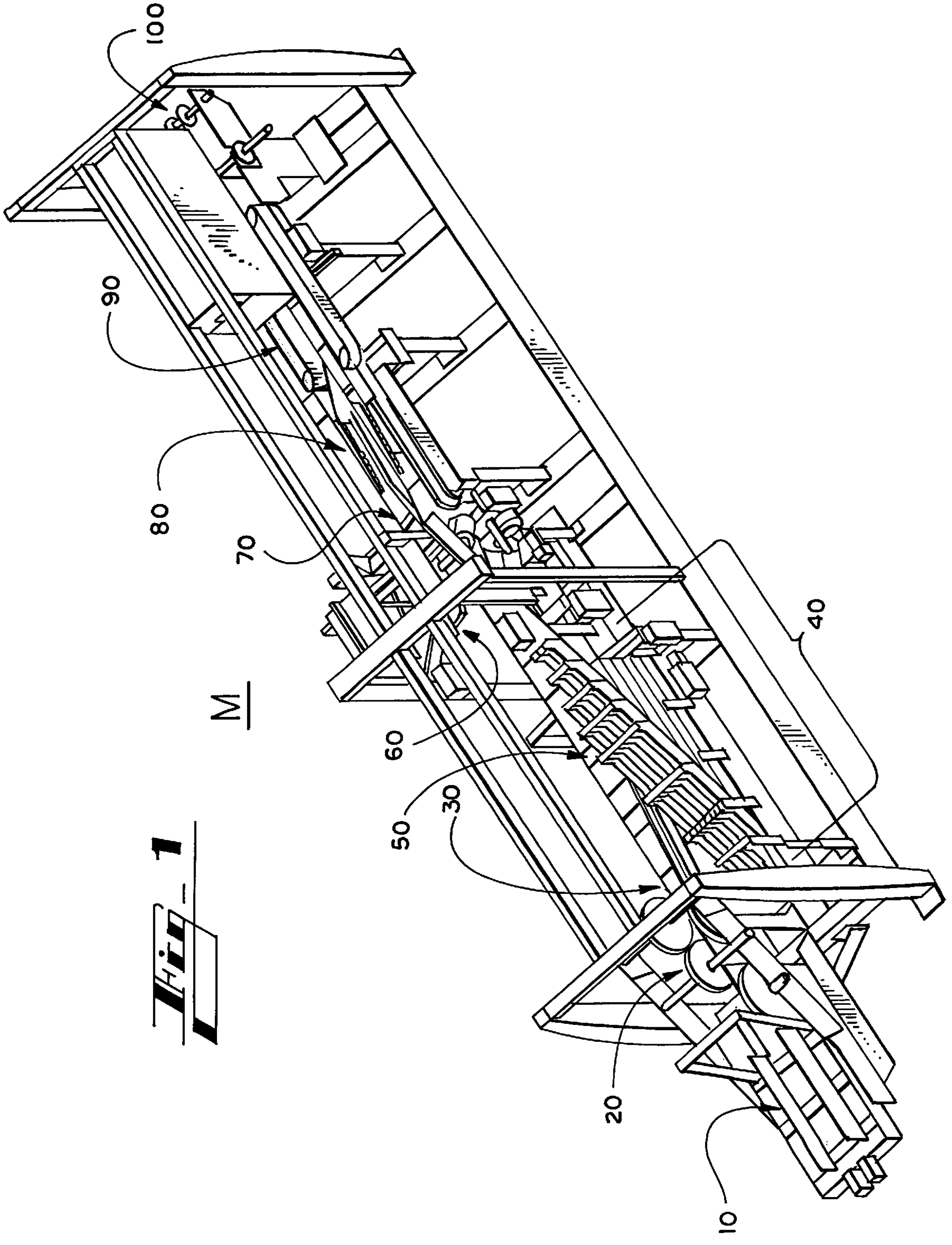
FIG. 1 is an isometric illustration of a continuous-motion cartoning machine which incorporates an adjustable carton feeder, in accordance with a preferred embodiment of the invention.

Throughout the drawings the same reference numerals are used to denote the same or like features of the invention.

Referring first to FIG. 1, therein is illustrated in the context of a continuousmotion cartoning machine M, an adjustable carton feeder 20, in accordance with a preferred embodiment of the invention. In the machine, the carton hopper 10 receives collapsed cartons stacked in substantially upright condition as shown. Cartons are withdrawn from the carton hopper 10 by the adjustable carton feeder 20 and then deposited in substantially erect condition at the beginning of the carton conveyor 30. As cartons are continuously engaged and translated through the machine M, articles, such as beverage cans, to be packaged in the cartons are also translated through the machine in synchronous motion with the cartons. An article conveyor 40 and article lane arrangement 50 form an article transport that urges the articles into the cartons. Article-engaging wheels 60 complete the process of placement of the articles into cartons. Side-flap folding wheels 70 (partially obstructed in FIG. 1) engage and inwardly fold the side flaps of cartons having side flaps. Glue is applied to the cartons at a gluing station 80. At a sealing station 90, end flaps of the cartons are pressed and held into contact with glue that has been previously applied. Packaged, sealed cartons are ejected from the machine at the ejection station 100.

Figure 2:
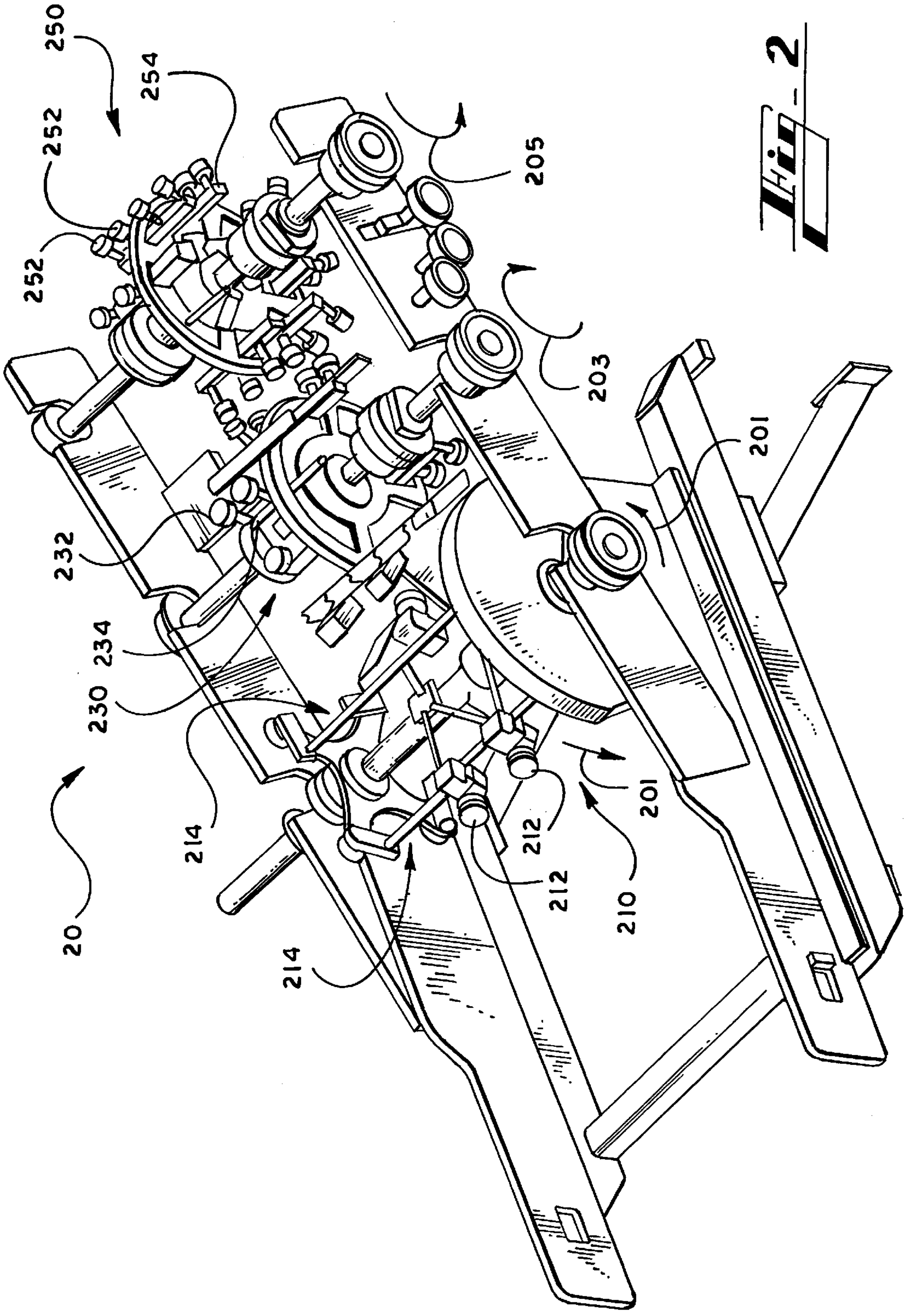
FIG. 2 is an isometric illustration of the isolated adjustable carton feeder of FIG. 1.

Reference is now particularly made to the adjustable carton feeder 20 illustrated in FIG. 2. The feeder 20 of the preferred embodiment illustrated is a three-wheel rotary type feeder. A first wheel assembly 210 (in the preferred embodiment a cam-wheel rotating in a first direction 201) engages a collapsed carton while the carton is in the hopper 10 and rotates the carton to a point where it is engaged by a second wheel assembly 230 (rotating in a second direction 203 that is opposite to the first direction of rotation 201) as the carton is disengaged by the first wheel assembly 210. The second wheel assembly 230 rotates the carton to a position where it is engaged by a third wheel assembly 250 (rotating in a third direction of rotation 205 which is opposite the direction of rotation 203 of the second wheel assembly 230). The third wheel assembly 250 subsequently places the carton at a location where it is engaged by the carton conveyor 30 and disengaged by the third wheel assembly 250.

Suction cups 212, 232, 252 mounted upon a plurality of suction-cup stations 214, 234, 254 of the feeder wheel assemblies 210, 230, 250 are the means by which the wheel assemblies 210, 230, 250 engage the surfaces of cartons. A vacuum is applied to each suction-cup station 214, 234, 254 and its associated suction cups 212, 232, 252 through distinct vacuum tubes. Because the operation of each wheel assembly 210, 230, 250 is similar, the description of the invention will now focus upon the structure and operation of the first feeder wheel assembly 210. As can be seen from the drawings, the first feeder wheel assembly 210 is more simply configured than the second wheel assembly 230 and the third wheel assembly 250 although it operates in the same manner. In the preferred embodiment, the first wheel assembly 210 is simple because it contains fewer suction-cup stations 212.

Figure 3:
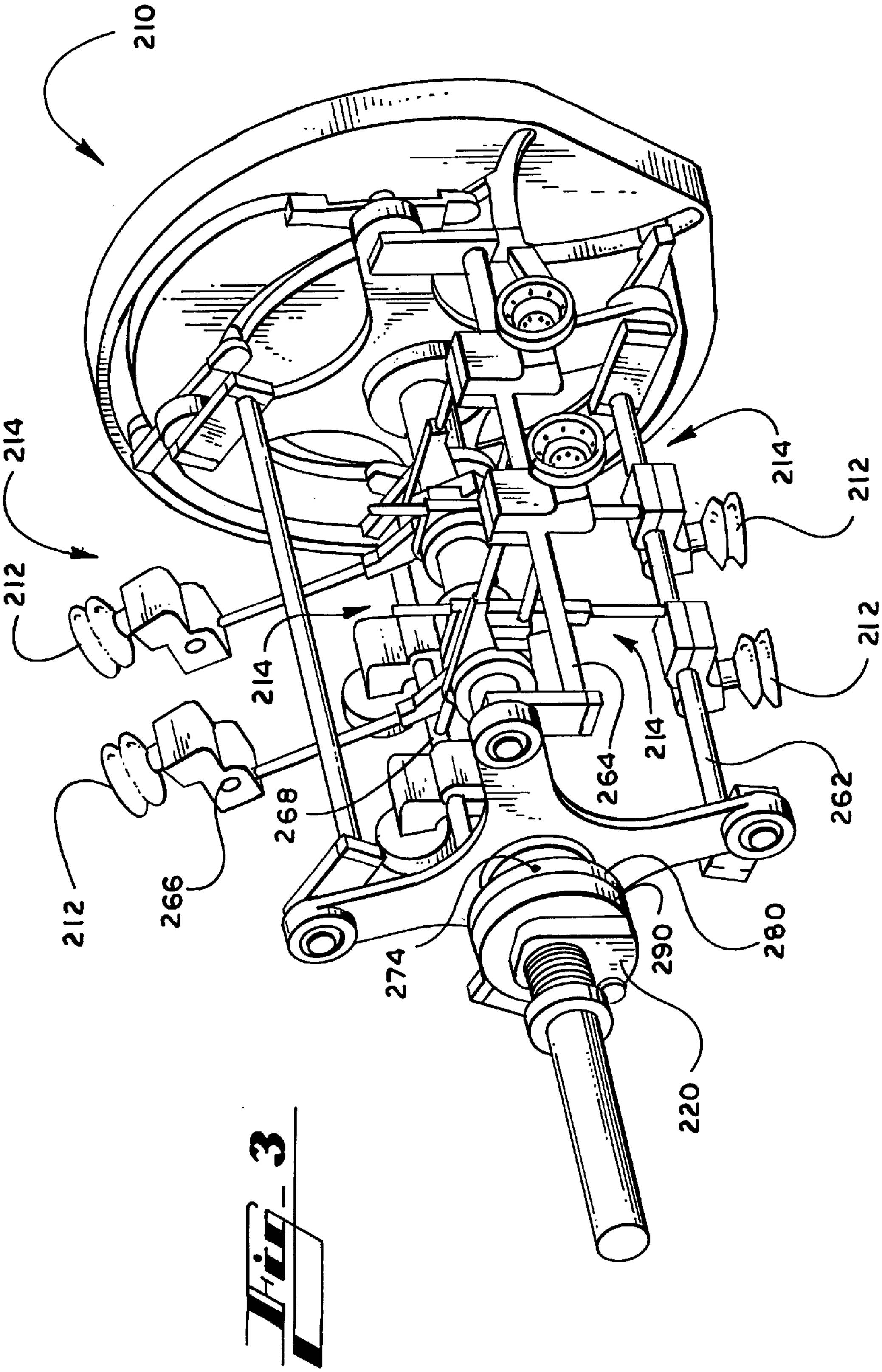
FIG. 3 is an isometric illustration of one of the rotary feeder sections of the adjustable feeder of FIG. 1.
Figure 4:
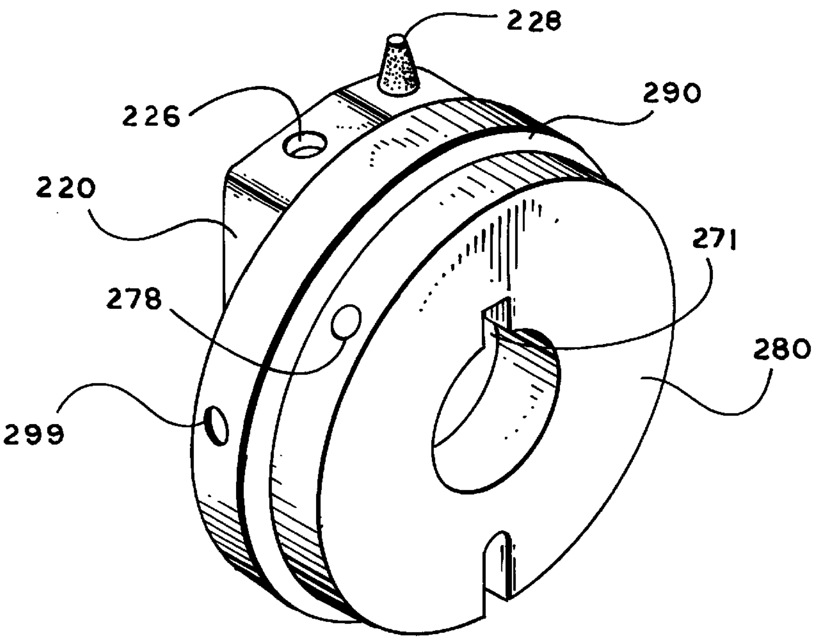
FIG. 4 is an isometric illustration of the valve assembly of the rotary feeder section of FIG. 3.
Figure 4A:
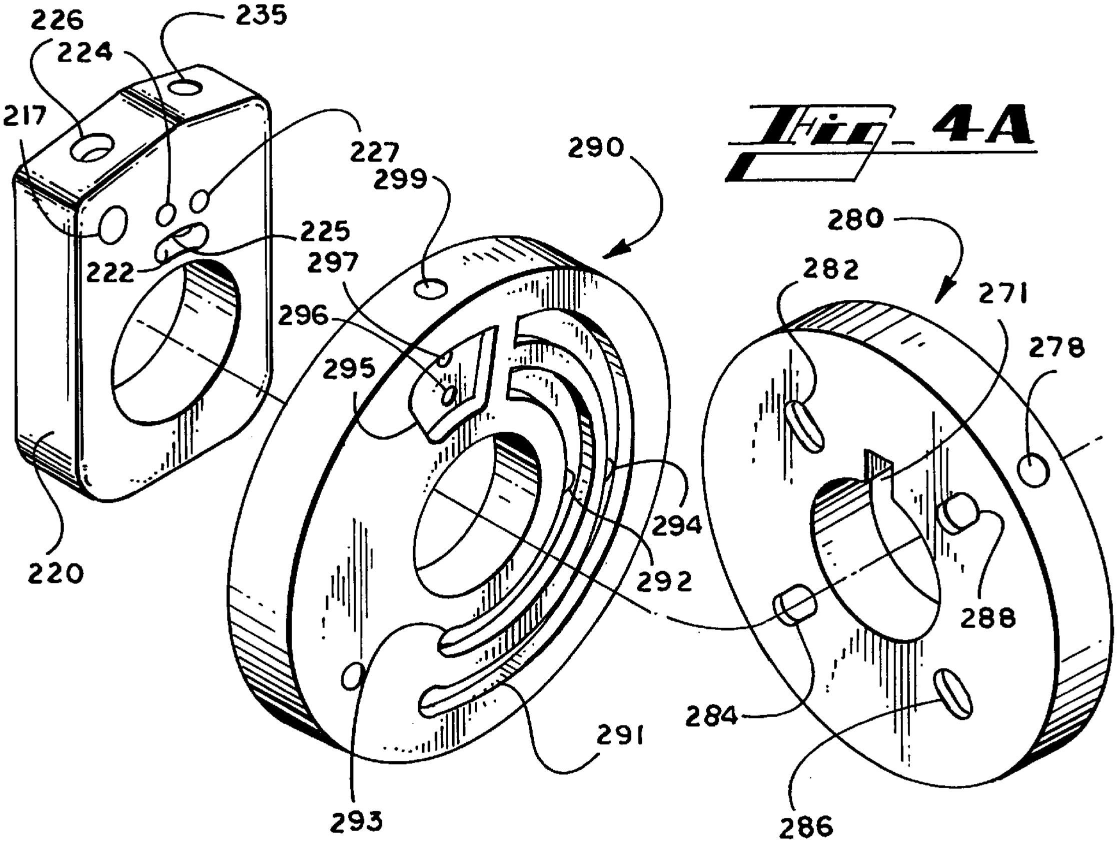
FIG. 4A is an exploded view of the valve assembly of FIG. 4.
Figure 5:
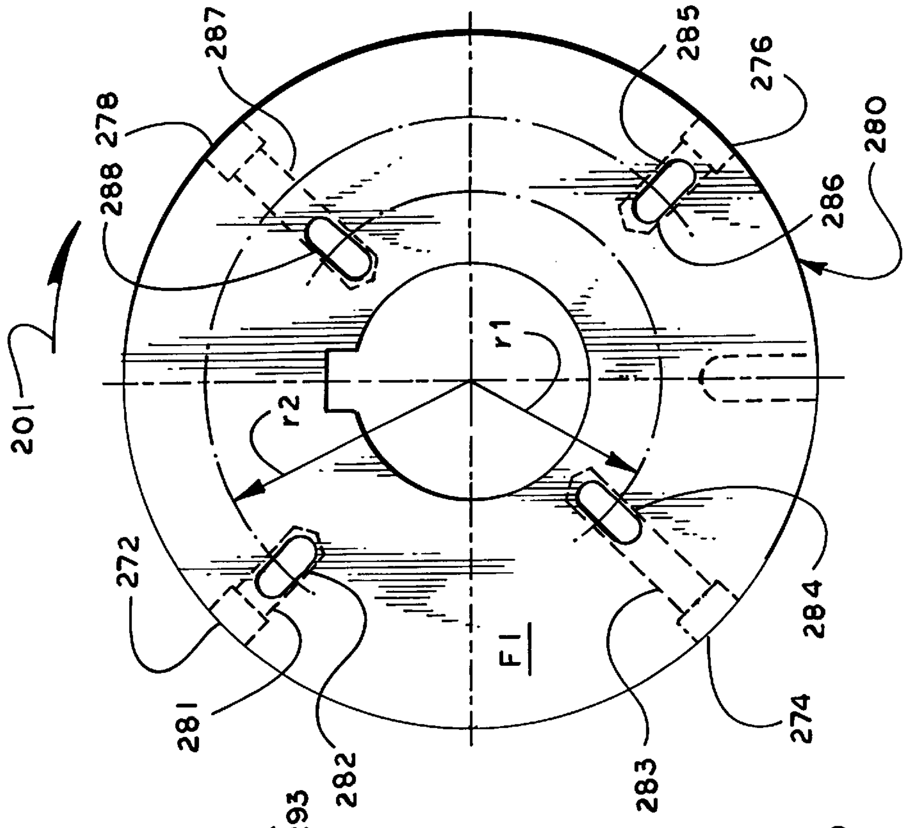
FIG. 5 is a side view of the rotating valve of FIG. 4, showing the outer face of the rotating valve.

Reference is now made to FIG. 3, which is an isometric illustration of the first wheel (cam-wheel) assembly 210 of the adjustable carton feeder 20. For convenience of explanation the individual suction-cup stations of the plurality of suction-cup stations 214 will be referenced by the numerals 262, 264, 266 and 268. Referring now also to FIGS. 4 and 5, vacuums are supplied to the suction-cup stations 262, 264, 266, 268 by conduits (not shown but generally known in the art) extending from ports 272, 274, 276, 278 of a rotating value 280 to the stations 262, 264, 266, 268. FIG. 4A is an exploded view of the valve component of FIG. 4 and has been included as a convenience. FIG. 4A may also be referenced whenever FIG. 4 is referred to. The rotating valve 280 and suction-cup stations 262, 264, 266, 268 are interconnected so that they rotate together in the first direction 201. (Suction conduit, or tubes, have been omitted for drawing clarity.) The rotating valve 280 is rotated by a shaft (not shown) keyed to the shaft engagement slot 271 of the rotating valve 280. Vacuums are applied to the vacuum ports 272, 274, 276, 278 through respective bores 281, 283, 285, 287 which extend through the rotating valve 280 and terminate in respective rotating vacuum apertures 282, 284, 286, 288 which extend through a face F1 of the valve 280. For convenience of reference this face F1 will be referred to as the outer face of the rotating valve 280. The vacuum apertures are disposed in diametrically opposed pairs at distinct radii about a center point of the face F1 of the rotating valve 280. Vacuum apertures 284 and 288 are disposed at a first radius r1, and vacuum apertures 282 and 286 are disposed at a second radius r2.

Figure 6:
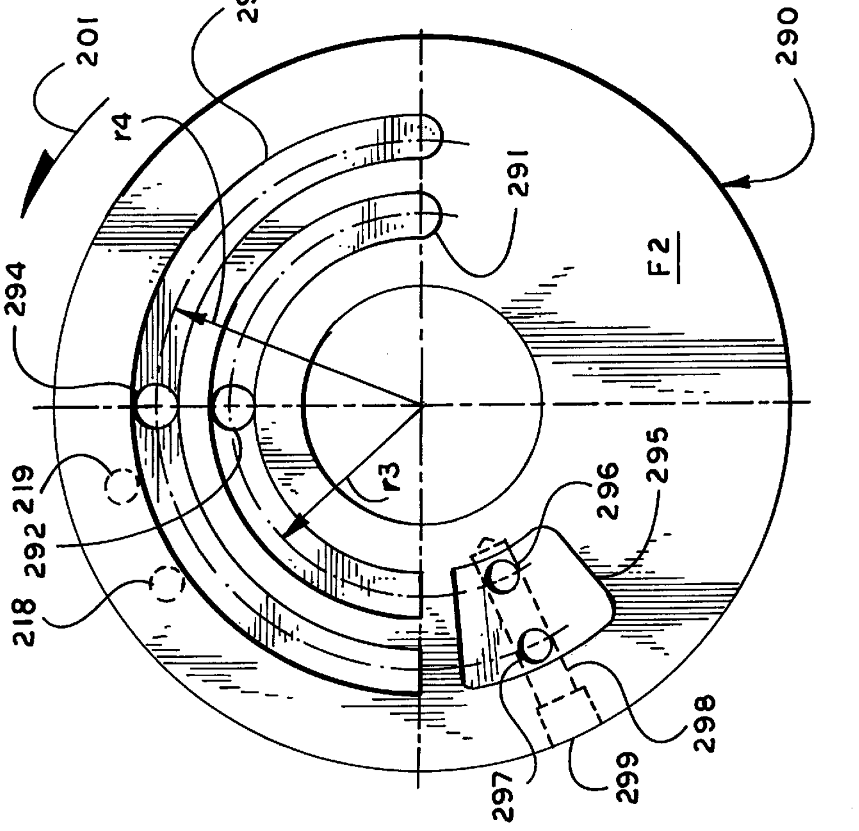
FIG. 6 is a side view of the stationary valve of FIG. 4, showing the inner face of the stationary valve.

The rotating valve 280 in turn receives its vacuum from a stationary valve 290 whose position is fixed relative to the rotational motion of the rotating valve 280. Referring now also to FIG. 6, the stationary valve 290 has arcuate grooves 291, 293 inscribed in what for convenience is referred to as the inner face F2 of the stationary valve. The rotating valve 280 and stationary valve 290 are coaxially disposed with respect to one another about their respective hubs. The outer face F1 of rotating valve 280 is in face contacting relationship with the inner face F2 of stationary valve 290 and rotates in the direction indicated by direction arrow 201 with respect to the fixed position of the stationary valve 290. The direction arrow 201 in FIG. 7 illustrates the direction of rotation of the rotating valve 280 when placed in face contacting relationship with the fixed stationary valve 290.

Referring now particularly to FIG. 6 but also to FIG. 5, in the stationary valve 290 a first arcuate groove 291 is inscribed generally at a third radius r3 which corresponds to the first radius r1 of the rotating valve 280. A second arcuate groove 293 is inscribed generally at a fourth radius r4 which corresponds to the second radius r2 of the rotating valve 280. The alignment of the arcuate grooves 291, 293 and the respective alignments with the pairs of rotating vacuum apertures 284/288, 282/286 causes the rotating vacuum apertures 284, 288, 282, 286 to circumscribe the respective arcuate grooves 241, 243 when the two valves 280, 290 are coaxially mounted and the rotating valve 280 is rotated with respect to the stationary valve 290. Stated somewhat differently for addition clarity, as illustrated by the direction arrow 201 in FIG. 6, the rotating valve 280 rotates in a counterclockwise direction with respect to the orientation of the stationary valve 290, thereby rotating the pairs of vacuum apertures 284/288, 282/286 through respective annular paths that overly the respective annular grooves 291, 293.

Figure 7:
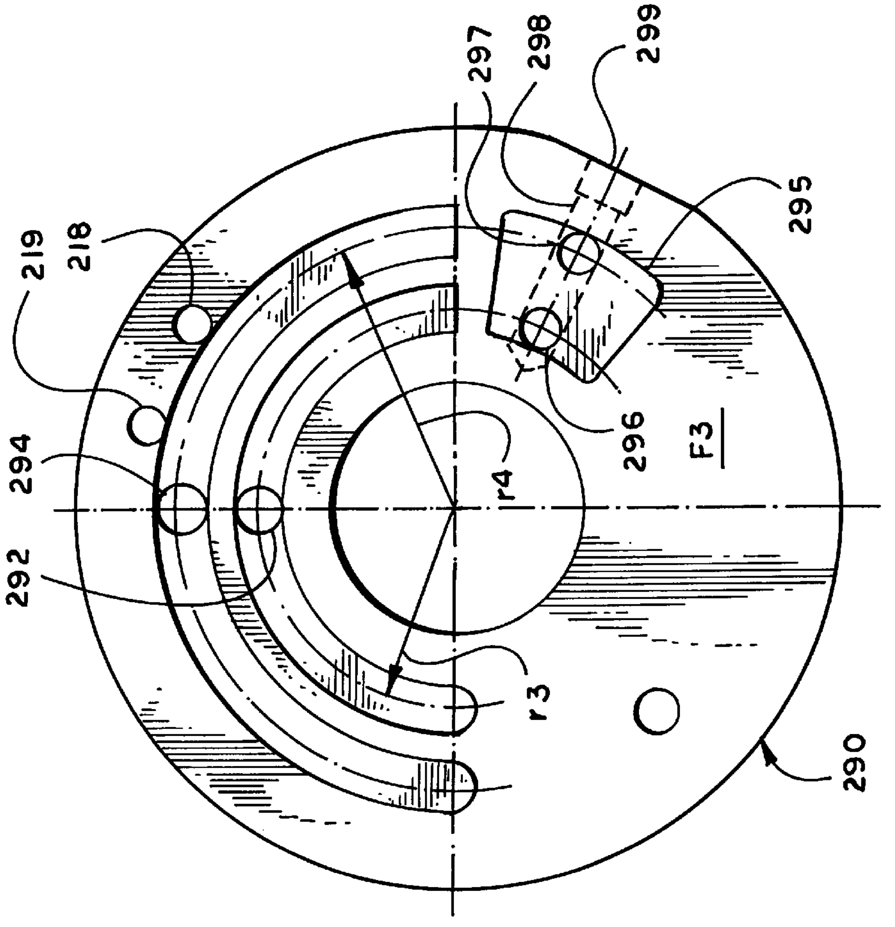
FIG. 7 is an opposite side view of the stationary valve of FIG. 4 showing the outer face of the stationary valve.

Now referring particularly to FIG. 6 and FIG. 7, a first substantially horizontal, stationary-valve vacuum bore 292 extends from the outer face F3 of the stationary valve 290 through the valve 290 terminating in the first arcuate groove 291. Similarly, a second substantially horizontal, stationary-valve vacuum bore 294 extends from the outer face F3 of the stationary valve 290 through the valve 290 terminating in the second arcuate groove 293. An air cavity 295 is also inscribed in the inner face F2 of the stationary valve 290. The air cavity 295 subtends an arc and has outer and inner edges which substantially causes the air cavity 295 to radially encompass the widths of the arcuate grooves 291, 293. The air cavity 295 is spaced apart from the annular path of the arcuate grooves 291, 293. Air pressure is supplied to the stationary valve 290 through an air port 299 in the circumferential edge of the valve 290. A primary stationary-valve air bore 298 extends from the port 299 into the valve 290. Secondary stationary-valve air bores 296, 297 connect the primary air bore 298 to the air cavity 295.

Figure 8:
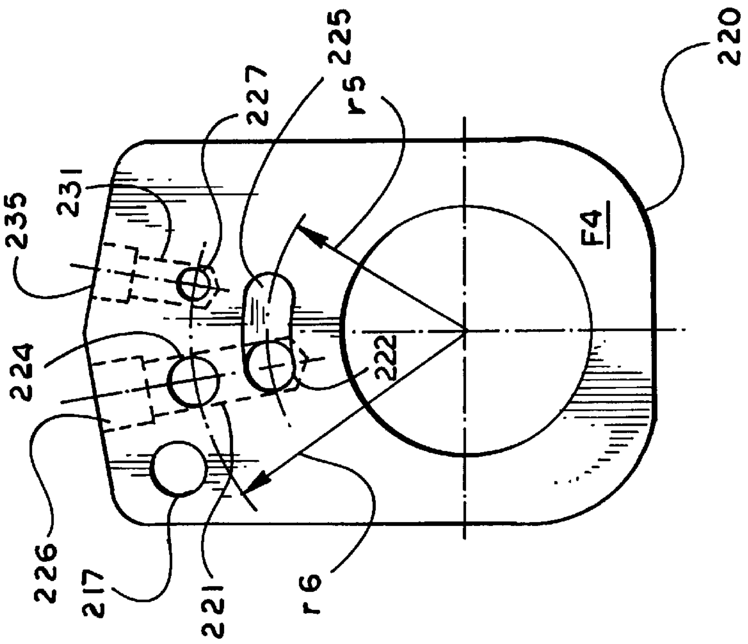
FIG. 8 is a side view of the changeover valve of FIG. 4, showing the inner face of the changeover valve.

Referring now particularly to FIG. 6, FIG, 7 and FIG. 8, seating apertures 218, 219 are disposed in the outer face F3 of the stationary valve 290 to receive a pin member which is inserted through the alignment aperture 217 in the changeover valve 220, as will be described in greater detail below. The changeover valve 220 is coaxially aligned with the rotating valve 280 and the stationary valve 290 about the hub of the changeover valve 220. A vacuum notch 225 is inscribed in the inner face F4 of the changeover valve 220. The vacuum notch 225 subtends an arc and is radially positioned at a radius r5 which corresponds to the opening to the first substantially horizontal vacuum bore 292 and, in turn, the radius r3 of the first vacuum groove 291. Thus, the vacuum notch 225 and the first vacuum bore 292 are alignable with one another when the inner face F4 of the changeover valve 220 and the outer face F3 of the stationary valve 290 are placed in face-to-face relationship with one another. The vacuum notch 225 subtends a relatively short arc. The changeover valve 220 has two secondary changeover-valve vacuum bores 222, 224. A first secondary changeover-valve vacuum bore terminates in a vacuum-notch aperture 222 at one end of the vacuum notch 225. A second secondary changeover-valve vacuum bore terminates in an auxiliary vacuum aperture 224 which is aligned radially outwardly of the vacuum-notch aperture 222 at a radius r6. The auxiliary vacuum aperture 224 is disposed at a radius r6 in the inner face F4 of the changeover valve 220 that corresponds to the radius r4 at the opening to the second substantially horizontal bore 294 at the outer face F3 of the stationary valve 290. Because of the corresponding radial positioning described, the auxiliary vacuum aperture 224 of the changeover valve 220 and the second bore 294 of the stationary valve 290 are alignable with one another when the inner face F4 of the changeover valve 220 and the outer face F3 of the stationary valve 290 are placed in face-to-face relationship with one another. A primary vacuum bore 221 connects the vacuum-notch aperture 222 and the auxiliary vacuum aperture 224, and the bores which form them, to the vacuum port 226. A secondary vent bore terminates at the inner face F4 of the changeover valve 220 in a vent aperture 227. The vent aperture 227 is aligned above the non-apertured end of the vacuum notch 225, and the vent aperture 227 is in radial alignment with the aperture 224 at the sixth radius r6. Similar to the positioning of the vacuum apertures 222 and 224, the vent aperture 227 and the non-apertured end of the vacuum notch 225 are respectively alignable with the apertures 294, 292 in the outer face F3 of the stationary valve 290 when the changeover valve 220 and the stationary valve 290 are placed in face-to-face relationship with one another. The vent aperture 227 is connected to the vent port 235 through primary vent bore 231. Referring again momentarily to FIG. 4, a filter is positioned over the vent port 235.

In operation a vacuum tube through which a vacuum is drawn is connected to the vacuum port 226 of the changeover valve 220. A tube delivering air pressure is connected to the air port 299 of the stationary valve. When the valve assembly is joined as shown in FIG. 4, the alignment of the alignment aperture 217 with a selected one of the pin-receiving apertures 218, 219 determines the paths of the vacuums drawn through the valve arrangement and, ultimately, which suction-cup stations 262, 264, 266, 268 on the cam-wheel assembly 210 are made operable.

Alignment may be achieved by way of several typical means of alignment, however, in the preferred embodiment illustrated a pin placed through the alignment aperture 217 in the changeover valve 220 and seated one of the alignment apertures 218, 219.

The changeover valve permits distinct modes of vacuum application to be selected. In a first mode, in which all of the suction-cup stations 262, 264, 266, 268 are enabled to draw vacuums the alignment aperture 217 is fixed in alignment with the pin-receiving aperture 219 which is closest to the vacuum apertures 292, 294. In this alignment, the inner vacuum aperture 222 (and end of the vacuum notch 225) of the changeover valve is in direct alignment with the inner aperture 292 of the stationary valve 290. Also in this first mode/position, the outer aperture 224 of the changeover valve 220 is in direct alignment with the outer aperture 294 of the stationary valve 290. In this alignment, vacuum is drawn through both of the vacuum apertures 292, 294 of the stationary valve 290 and, in turn, also through both of the arcuate vacuum grooves 291, 293. As previously discussed above, the rotating valve 280 rotates in the direction 201 with respect to the stationary valve 290 such that the inner (first) apertures 284, 288 and outer (second) apertures 282, 296 travel the counter-clockwise annular path of the respective arcuate vacuum grooves 291, 293. It is to be again noted that the direction arrow 201 in FIG. 5 indicates the direction of rotation of the outer face F1 of the rotating valve 280 and in FIG. 6, the direction arrow 201 again designates the direction of rotation of the rotating valve 280 but in relation to the stationary valve 290 shown in FIG. 6. The direction arrow 201 in FIG. 6 does not indicate that the stationary valve 290 rotates but is shown as a reference to denote the direction of rotation of the outer face F1 of the rotating valve 280 with respect to the inner face F2 of the fixed-position stationary valve 290.

As the apertures 284/288, 282/286 travel circumferentially along the path of the respective arcuate grooves 291, 293 vacuum is drawn through those apertures and ultimately through the respective ports 274/278, 272,276 and respective suction-cup stations 264/268, 262/266. In this manner the suction cups of each one of the suction-cup stations draw vacuum during a designated period (that is, the time each one of the apertures 282, 284, 286, 288 travels along the arcuate groove 291, 293 with which it is radially aligned). Each aperture 282, 284, 286, 288 draws a vacuum through the suction cups 212 of a corresponding suction-cup station 262, 264, 266, 268. Because of the angular separation of the apertures 282, 284, 286, 288 with respect to one another each suction-cup station begins to draw vacuum and discontinues the vacuum in sequence. As each aperture 282, 284, 286, 288 leaves its corresponding arcuate groove 291, 293, the vacuum is discontinued. To ensure that the vacuum is discontinued and that the carton drawn to the suction cups is released, positive air pressure (that is, in comparison to the negative flow of a vacuum) is passed from the air cavity 295 through the apertures 282, 284, 286, 288 to the suction cups 212, thereby breaking the seal between an engaged carton and the suction cups 212.

The vacuum-activation of all of the suction-cup stations is suitable in the preferred embodiment for feeding of cartons of small configuration wherein one carton is engaged by each suction-cup station. When it is necessary to feed larger cartons that extend over two adjacent suction-cup stations, such as stations 284 with 286, and 288 with 282, it is necessary to disable one of the adjacent stations so that a carton which extends over two adjacent stations can be properly released without the trailing suction-cup still engaging the carton when it should be released. The ability to selectively disable (from suction) alternating suction-cup stations is made possible by the angular displacement of the vacuum apertures 282, 284, 286, 288 with respect to one another and the radial offset of alternating ones of the vacuum apertures 282, 284, 286, 288. That is, one set of apertures (the inner apertures 284, 288 in the preferred embodiment) is always connected to vacuum (as will be explained below) while the other set of apertures (the outer apertures 282, 286 in the preferred embodiment) can be selectively enabled and disabled.

To disable the outer set of vacuum apertures 282, 286 and their associated suction-cup stations 262, 266, the changeover valve 220 is moved to a position with respect to the stationary valve 290 wherein the alignment aperture 217 is aligned with the pin-receiving aperture 218 which is farthest from the stationary valve vacuum apertures 292, 294. In this alternative, disabling alignment, the non-apertured end of the vacuum notch 225 is aligned over the inner vacuum aperture 292 of the stationary valve 290 whereby a vacuum continues to travel from the vacuum port 226, through the aperture 222, along the vacuum notch 225 and along the inner (first) arcuate groove 291. On the other hand, the outer vacuum aperture 294 of the stationary valve is in direct alignment with vent aperture 227 of the changeover valve such that the outer (second) arcuate groove 293 of the stationary valve 290 [and ultimately the outer (second set of) apertures 282, 286 of the rotating valve 280 and suction-cup stations denoted by numerals 262, 266] are vented to the atmosphere, thereby disabling the suction cups 212 at the stations denoted by numerals 262, 266.

Modifications may be made in the foregoing without departing from the scope and spirit of the claimed invention. For example, although the invention has been described in the context of having apertures and vacuum grooves disposed at two radii, the teachings of the invention contemplate a distribution of apertures and corresponding vacuum grooves at multiple radii. Thus, the multiple may not only be two, but may be three or higher multiples.

What is claimed is:

1. A carton feeder comprising:

a plurality of carton-engagement stations rotatable about an axis each said carton-engagement station having at least one suction orifice for engaging a carton;

a first set of fluid passageways rotatable about said axis having first ends in respective fluid flow communication with said at least one suction orifice of each said carton feeder station for applying a vacuum thereto and having a plurality of sets of second ends for receiving a vacuum applied thereto corresponding to distinct combinations of said plurality of carton-engagement stations;

a second set of fluid passageways having a first set of fluid openings in complimentary fluid-flow alignment with respective ones of said plurality of sets of second ends of said first set of fluid passageways such that as said first set of fluid passageways rotate about said axis said first set of fluid openings intermittently applies vacuum to said respective ones of said plurality of sets of second ends of said first set of fluid passageways and having a second set of fluid openings in fluid-flow communication with said first set of fluid openings; and a vacuum distributor in fluid-flow communication with said second set of fluid openings selectively adjustable between a plurality of vacuum distributing positions wherein at each of said plurality of vacuum distributing positions vacuum is applied to a distinct combination of ones of said second set of fluid openings whereby vacuum is ultimately selectively applied to said distinct combinations of carton-engagement stations.

2. The carton feeder of claim 1, wherein said plurality of vacuum-distributing positions comprise two vacuum-distributing positions.

* * * * *